United States Patent [19]

Reichenbach et al.

[11] 4,363,595
[45] Dec. 14, 1982

[54] APPARATUS FOR UNLOADING MOLDED ARTICLES

[75] Inventors: Jerry D. Reichenbach, Carpentersville; Keith W. Christiansen, Fox River Grove, both of Ill.

[73] Assignee: Chicago Rawhide Manufacturing Company, Elgin, Ill.

[21] Appl. No.: 148,916

[22] Filed: May 12, 1980

[51] Int. Cl.³ .............................................. B29C 3/04
[52] U.S. Cl. ................................... 414/749; 198/424; 198/485; 414/728
[58] Field of Search ..................... 100/218; 425/403.1; 414/728, 736, 424, 415, 652, 182, 749, 751, 753; 198/485, 424, 429

[56] References Cited

U.S. PATENT DOCUMENTS

| | | | |
|---|---|---|---|
| 2,695,619 | 11/1954 | Soule | 414/652 X |
| 3,178,040 | 4/1965 | Nelson | 414/753 X |
| 3,767,063 | 10/1973 | McKinven, Jr. | 414/753 |
| 3,792,857 | 2/1974 | Bubley | 414/753 X |
| 3,860,231 | 1/1975 | Oltra | 414/753 X |
| 3,954,186 | 5/1976 | Hafele | 414/751 X |
| 3,974,919 | 8/1976 | Bokalders | 414/728 |
| 4,050,870 | 9/1977 | Frigo | 414/751 X |

*Primary Examiner*—Robert J. Spar
*Assistant Examiner*—Terrance L. Siemens
*Attorney, Agent, or Firm*—James T. FitzGibbon

[57] ABSTRACT

An apparatus for unloading molded articles from a molding machine having a reciprocally mounted unloader assembly. The unloader assembly is provided with a plurality of slotted bars to receive a plurality of molded articles between adjacent pairs thereof. The molded articles retained between adjacent pairs of unload bars are moved to a position at which cam followers coupled to the moveable unloader assembly contact respective fixed stop plates. Upon contact, the unloader assembly swings about a pivot rod to deposit the molded articles into a collection element.

7 Claims, 5 Drawing Figures

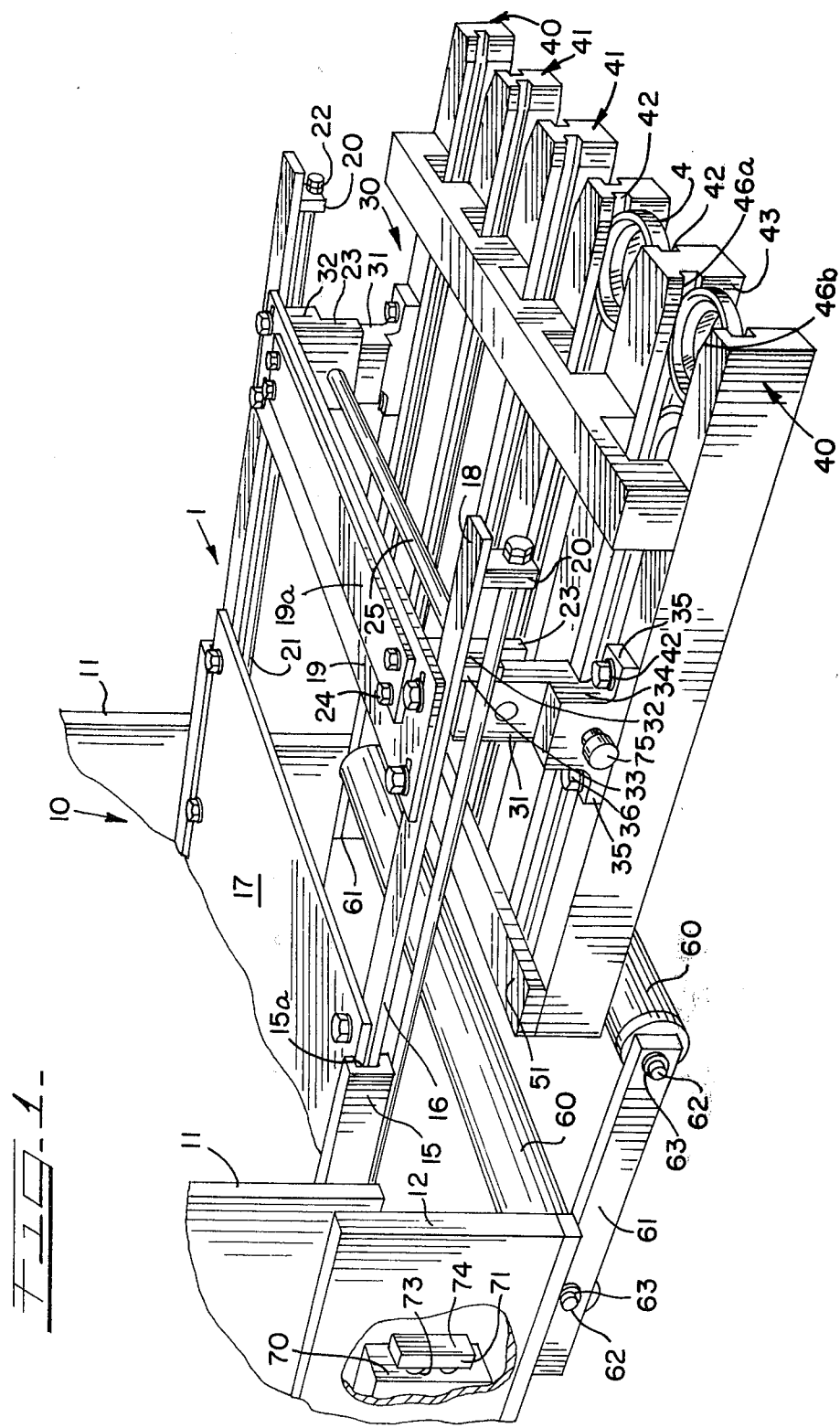

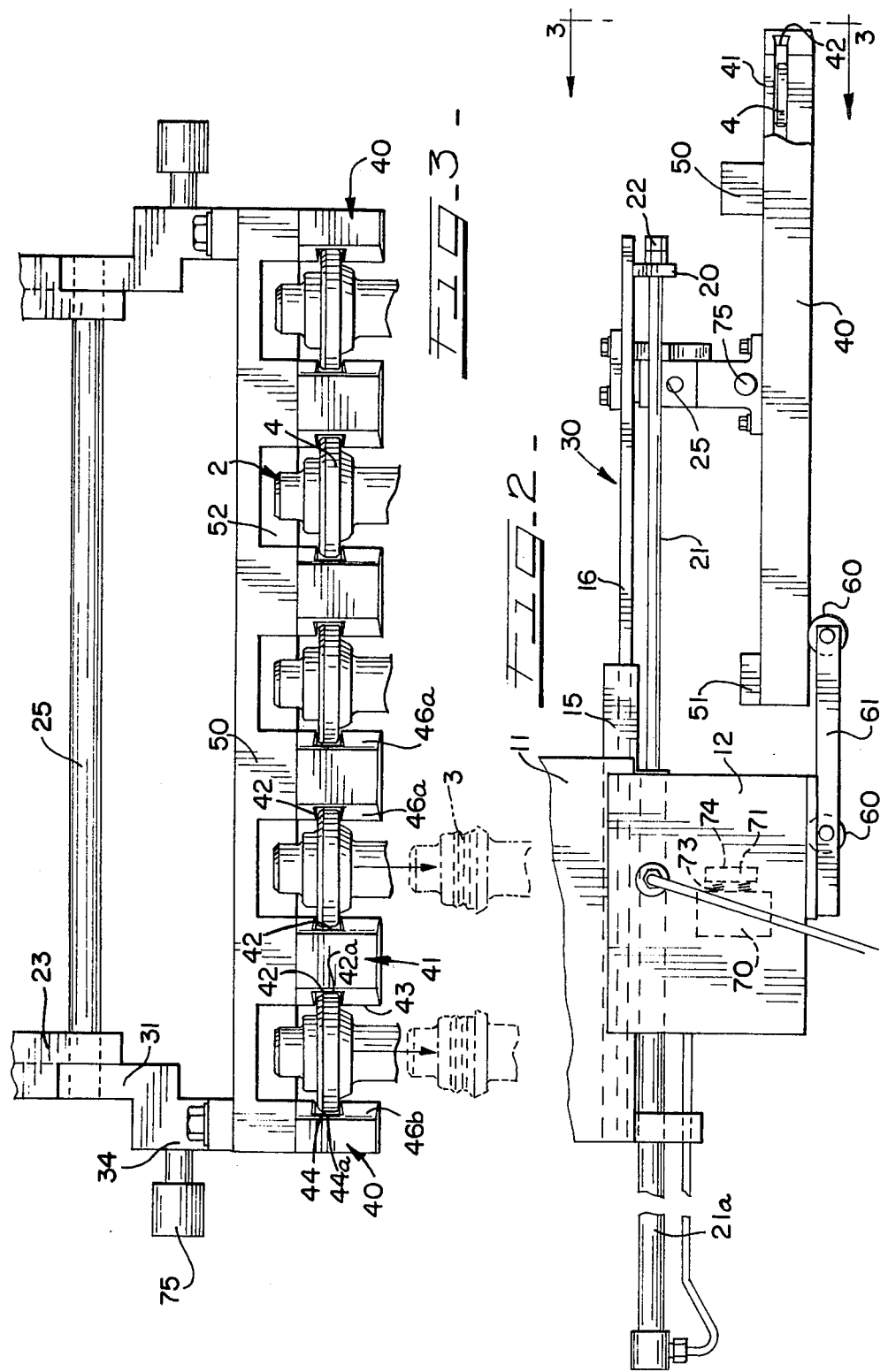

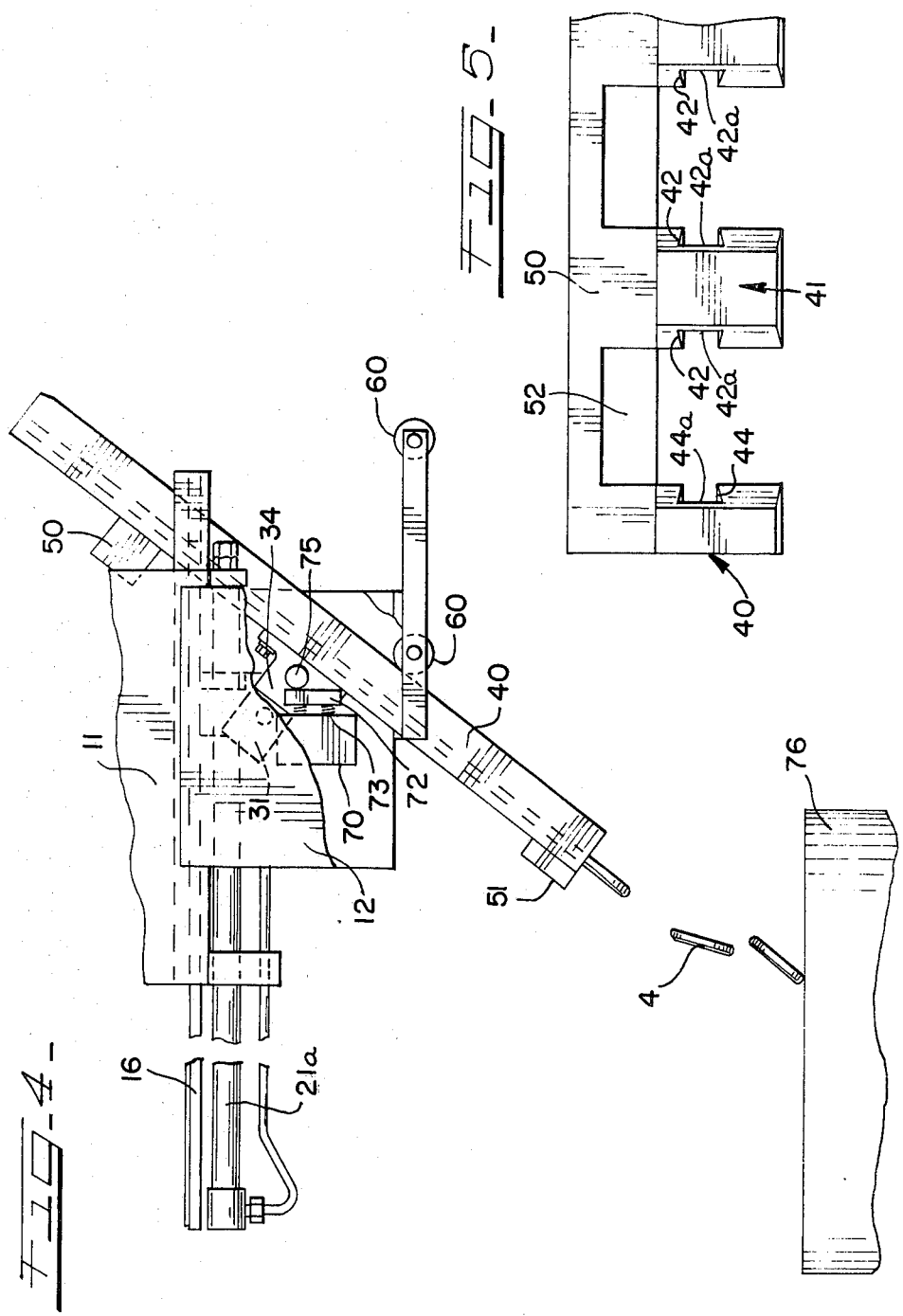

APPARATUS FOR UNLOADING MOLDED ARTICLES

BACKGROUND OF THE INVENTION

This invention relates in general to an apparatus for manufacturing articles, and in particular, to the molding of materials.

More specifically, but without restriction to the particular use which is shown and described, this invention relates to an apparatus for unloading molded articles which are manufactured by a molding machine.

Many articles are manufactured by being molded into a desired configuration from an elastomeric material and the like. One type of molding is known in the art as compression molding, by which a blank or "prep" is heated into a fluent state and is compressively caused to assume a shape defined by a die cavity. An example of the employment of compression molding as a manufacturing technique exists in the oil seal industry. One common oil and grease seal manufactured through a molding process comprises a seal body having one or more sealing lips fabricated from a natural or synthetic elastomer, which is bonded to or otherwise cooperates with at least a part of a stiff casing or other structural member. The casing, stamping, or stiffener is utilized to provide rigid mounting of the seal, while the elastomeric seal body in use engages one or more members to provide fluid retention and the like.

It is common practice to manufacture such oil seal articles by compressive molding, because of the relative economy and simplicity of the process. Compression molding permits large numbers of articles to be formed simultaneously in multiple cavity molds in a single cycle of the molding press. It is possible to produce 24, 36, 48 or other large number of parts during one heat cycle of operation of the machine. To accomplish the simultaneous molding of a large number of articles, compression molding machines are generally physically large and include a plurality of cooperable plates and die components. A molding plate possesses a substantial surface area to accomodate the plurality of molding stations required to produce a multiple output. Accordingly, physical access to the finished oil seals formed at each of the molding stations at the conclusion of a molding operation is cumbersome and inconvenient. Because of the large number of articles which are molded at such relatively inaccessible stations, it is inefficient and time consuming for the machine operator to reach and unload the plurality of molded articles by hand at the conclusion of a molding cycle. Manual retrieval is further undesirable, since it is possible that one or more finished parts may be inadvertently left in the molding plate and interfere with the subsequent operation of the press. Physical handling of the finished oil seals after molding is also unsuitable and potentially hazardous, because of the temperature to which the seal is elevated following a molding operation. Often a molded oil seal can attain a temperature in excess of 300° F. following a compression molding operation. Such heated articles require the use of gloves or other protective measures to prevent injuries to the press operator. Thus, one by one manual retrieval of the finished parts is an undesirable technique for unloading molded articles from the molding press.

In the prior art, several automatic retrieval systems have been employed to overcome the inherent problems of manual removal of the molded oil seals. Such automated techniques have relied upon the use of relatively complicated systems, which have not attained an optimum level of efficiency and economy. Prior art unload apparatus tend to subject the molding machine and the molded parts themselves to unnecessary stress and impact. Moreover, conventional unloaders are deficient in attaining a high degree of efficiency of operation in conjunction with the molding apparatus for maximum productivity.

SUMMARY OF THE INVENTION

It is, therefore, an object of this invention to improve molding of articles.

Another object of this invention is to improve the unloading of finished articles from a molding machine.

A further object of this invention is to improve the efficiency and effectiveness of unloading molded articles from a molding machine.

A still further object of this invention is to automatically unload and collect finished molded articles from a molding machine with a labor saving and economical apparatus.

A still further object of this invention is to eliminate manual handling of finished articles manufactured by a molding operation.

Still another object of this invention is to facilitate the retrieval of molded articles unloaded by an unloading apparatus.

A still further object of this invention is to collect a plurality of molded articles in a single mode of operation for transport to a collection station.

Still another object of this invention is to collect a plurality of finished molded articles from a molding machine by automatic means moving into physical contact therewith and transporting the molded articles to a collection station.

These and other objects are attained in accordance with the present invention wherein there is provided an improved apparatus for unloading molded articles from a molding machine and the like. The apparatus herein disclosed is capable of movement relative to the manufactured articles for retrieval thereof in a single sequence of operation and subsequent removal to a point of collection. The apparatus for unloading molded articles of the invention alleviates the prior art problem related to manual collection of the finished products and is directed to a more economical and less complex system than the automatic unloading techniques used in the prior art.

The apparatus herein disclosed includes slotted unload means, which is capable of movement relative to the finished articles to collect the plurality of molded articles in effective cooperation with the operation of the molding machine. The superior adaptation of the unloader apparatus of the machine with the normal mode of operation of the molding press insures increased productivity and overall efficiency of manufacture. The molded oil seals and the like are deposited through a novel swinging motion of the slotted unload means that allows the parts to fall into a collection means.

DESCRIPTION OF THE DRAWINGS

Further objects of the invention, together with additional features contributing thereto and advantages accruing therefrom, will be apparent from the following description of a preferred embodiment of the invention, which is shown in the accompanying drawings with like reference numerals indicating corresponding parts throughout, wherein:

FIG. 1 is a side perspective view of the apparatus of the invention for unloading molding articles from a molding machine;

FIG. 2 is a partial side schematic view of the apparatus for unloading molded articles from a molding machine shown in FIG. 1;

FIG. 3 is an end schematic view taken along lines 3—3 of FIG. 2 with the lower insert of the molding machine shown in operative position relative thereto;

FIG. 4 is a side schematic illustration of the apparatus for unloading molded articles of the invention during an unloading mode of operation following collection of the molded articles from the molding machine; and FIG. 5 is a partial end view, with parts cut away, of the slotted unloader assembly of the apparatus for unloading molded articles of the invention.

DESCRIPTION OF THE PREFERRED EMBODIMENT

Referring now to FIGS. 1 through 5, there is illustrated the improved apparatus for unloading molded articles of the invention, generally designated by reference numeral 1, adapted to be mounted in operative relationship on a conventional molding machine in the form of a compression molding press (not shown) and the like. A compression molding machine is generally employed to manufacture various articles such as, for example, oil seals and similar parts. Typical molding machines are capable of manufacturing a plurality of oil seal members at respective co-planar molding stations 2 arranged in perpendicularly oriented rows, such as one of the rows shown in FIG. 3.

During the molding operation, an elastomeric material is caused to assume an annular configuration having a cross sectional shape dependent on the form of the die components of the molding machine. The die components of the machine include a plurality of upper inserts (not shown), which move downward into cooperative relationship with corresponding lower dies or inserts 3 (FIG. 3) to form a die cavity (not shown) defining the shape of the article to be molded. Prior to the molding process, a rigid casing and the "preps" or blanks of elastomeric material are placed in proper operative positions between the upper and lower inserts, which are supported on respective top and bottom molding plates. Axially disposed surfaces of the upper and lower inserts apply a compressive force to the respective preps at an elevated temperature to cause the elastomeric material to attain a more fluent state and flow into the mold cavities defined by the mold elements. In the sequence of operation shown in FIG. 3, the upper inserts have been withdrawn after the molding operation, and the finished molded articles 4 are supported by the lower inserts 3. The molded articles 4 are then in a position to be unloaded from the molding machine by the improved apparatus for unloading molded articles 1 of the invention in cooperative action with the lower inserts. After the unloader apparatus 1 has moved to a position to collect the plurality of oil seals in a manner to be described, the lower inserts 3 are withdrawn, as shown in phantom FIG. 3, to permit removal and collection of the parts from the molding machine. The foregoing description of the molding process and formation of the molded oil seals is conventional and further description thereof is not necessary for a clear understanding of the invention of the application.

The apparatus 1 of the invention includes a housing 10 formed by a pair of upper side plates 11 and a pair of lower side plates 12. The lower plates 12 are attached to the bottom portion of the upper side plates 11 by any suitable technique, such as by a plurality of bolt assemblies and the like. The upper side plates 11 may be suitably coupled to the molding machine (not shown) by a transverse support member or other support (not shown) affixed thereto to attain adequate support of the article unloader apparatus 1 at a suitable position to permit unloading of the molded articles.

A pair of parallel extending channel members 15 having a longitudinal groove 15a are respectively secured to the inner bottom portions of the upper side plate 11. A pair of elongated unloader slide bars 16 are supported by and slideable in the groove 15a for reciprocable movement relative to the housing 10. The unloader slide bars 16 form rigid structures by means of a flat plate 17 attached by bolt assemblies to the upper surfaces of the slide bars 16. The outward portions 18 of each of slide bars 16, extending beyond the ends of the channel members 15, are further coupled by slotted unloader mounting bars 19 affixed to the upper surfaces of the slide bars 16 to form a unitary structure.

A pair of downwardly disposed support arms 20 are respectively carried beneath the end portions 18 of each of the slide bars 16 to receive a pair of extension rods 21 of hydraulic actuators 21a (FIG. 2). The outer ends of the extension rods 21 extend through an aperture provided in each of the support arms 20 for rigid attachment thereto. The extension rods 21 are affixed to the support arms 20 by a conventional threaded coupling 22 or other well known attachment technique. It should be apparent that retraction and extension of the extension rods 21 during actuation of the hydraulic actuators 21a cause the slide bars 16 to move reciprocally relative to the upper side plates 11 for the purpose of unloading and removing the molded articles 3 from the molding machine in a manner to be described.

A pair of upper hinge plates 21 are secured to the lower face of the mounting bar 19 and an upper support cross bar 19a by a plurality of bolt assemblies 24 and support a slotted unloader assembly 30 of the unloader apparatus 1 of the invention. The slotted unloader assembly 30 includes a pair of upright base members 31 arranged in overlapping relationship to the outer surfaces of hinge plates 23. A suitably retained, elongated pivot rod 25 extends through aligned openings in the base members 31 and hinge plates 23 to permit pivotal movement of the base member 31 relative to hinge plates 23. A stop shoulder 32 protrudes from a portion of each of the hinge plates 23 and includes a surface in contact with the forward edge 33 of the base member 31 in the position shown in FIG. 1. The stop shoulder 32 prevents undesired pivotal movement of base member 31 in a clockwise direction about the axis of rod 24 viewing FIG. 2.

The lower portions of the base members 31 form laterally offset, lower base members 34, which include a lower portion affixed to the upper surfaces of a pair of left and right outer unload bars 40 of the slotted unloader assembly 30. The lower base members 31 have outwardly extending shoulders 35, through which bolt assemblies 36 couple each of the lower base members 34 to a respective outer unload bar 40.

As best shown in FIGS. 1, 3 and 5, the outer unload bars 40 of the slotted unloader assembly 30 are separated by a plurality of spaced center bars 41 disposed in parallel relationship to each other and to the left and right outer unload bars 40. The center bars 41 are in the form of equally spaced, elongated members having a rectangular or square cross-sectional configuration. Open-ended slots 42 are formed along the longitudinal extent of the lateral faces 43 of the center bars, and the slots 42 are disposed in a common plane. The slots 42 have a wedge-like cross-sectional configuration and are situated in parallel alignment with each other. The outer unload bars 40 are similarly elongated members situated in parallel relationship to the adjacent ones of the center unload bars 41. The outer unload bars include a respective open-ended elongated slot 44 formed on their inner lateral faces. As shown in FIG. 3, the bottom portion 44a of slots 44 of each of the outer unload bars 40 is spaced from the bottom 42a of an opposed slot 42 of an adjacent center bar 41, as shown in FIGS. 3 and 5, by a distance slightly greater than the diameter of a molded article 4. The bottom 42a of confronting slots 42 of adjacent center bars 41 are similarly spaced from each other by the same distance.

Although the outer unload bars 40 may possess the identical cross-sectional shape as center bars 41, the outer unload bars 40 include a modified form, such as an approximate one-half of the cross-section of the center bars 41. The outer ends of center bars 41 include a respective pair of lateral beleved surfaces 46a to aid in unloading the molded articles from the machine, while the outer bars 40 have a beveled surface 46b of the lateral inside surface as best shown in FIGS. 3 and 5. The parallelism of the outer unload bars 40 and the center unload bars 41 is maintained by a cross bar 50 affixed to a portion of the upper surface of each of the unload bars 40 and 41. A second upper back plate 51 (FIGS. 2 and 4) is also coupled to the unload bars 40 and 41 for support of the unloader assembly 30. The cross bar 50 includes a plurality of slots 52 having a width equal to the spacing of the bars 40 from adjacent ones of the center bars 41, or between adjacent center bars 41. The slots 52 are provided with a height sufficient to permit the cross bar 50 to clear the lower inserts 3 of the molding machine during movement of the unload assembly 30 relative thereto. As shown in FIG. 3, the unloader assembly 30 is adapted to be laterally moved relative to the molded articles 4 through extension of hydraulic rods 21, while the lower inserts are supporting the parts after a molding operation.

The plurality of slots 42 and 44 provided in the unload bars are of a sufficient depth and width to embrace the periphery of each of the molded articles 4 to support the articles therein; but permit movement of unloader assembly 30 relative to the finished articles while being supported on lower insert 3. The unloader apparatus 1 is operatively coupled to the molding machine to permit horizontal alignment with the molded articles 4, such that the slots 42 and 44 of the unload bars 40 and 41 are horizontally aligned with the rows of articles 4 supported on the lower inserts 3.

The bottom surfaces of the slotted unload bars 40 and 41 are arranged to roll, for added support, over a pair of spaced, transversely oriented rollers 60 of any suitable form, such as, for example, a tubular metal member. As shown in FIG. 1, the rollers 60 are attached to a pair of roller bars 61 affixed to each of the lower plates 12. The roller bars 61 receive the ends of respective roller shafts 62, which support the rollers 60 for rotatable movement during movement of the unloader bar assembly 30. The ends of shafts 62 are attached to the roller bars by conventional securement means in the form of retaining ring assemblies 63 and the like.

Referring in particular to FIGS. 1, 2 and 4, the lower side plates 12 respectively support a pair of stop blocks 70 (one of which is shown in FIG. 1) on its inner surface by means of a plurality of bolt assemblies (not shown). Each stop block 70 carries a stop plate 71 by means of a resilient mounting having spring members 73. The stop plate includes an axially disposed surface 74 confronting the unloader assembly adjacent its path of movement. The outer surfaces of the lower base members 34 of the unloader assembly 30 support a pair of cam followers 75, which are adapted to contact a respective stop plate 72 during retraction of the extension rods 21 of the hydraulic actuators 21a. After contact of the cam followers 75 with the stop plate 71, the unloader assembly 30 is induced to pivot or swing relative to the upper slide bar assembly at the pivot connection provided by the pivot rod 24, the hinge plates 23 and base members 31. As shown in FIG. 4, the swinging movement of slotted unload assembly 30 is guided by the back roller 60 as the unloader assembly 30 lifts from the front roller 60. The swinging movement of the slotted unload assembly 30 orients the open-ends slots 42 and 44 in a downward direction, such that the molded articles 4 are caused to drop from their positions within the slots into collection means such as in receptacle 76 and the like.

In operation, the molding machine to which the unloader assembly 30 is operatively coupled, functions to manufacture a plurality of molded articles, such as oil seals 4 and the like. The upper plate and associated inserts of the molding machine are withdrawn after a molding operation by upward movement from the molding stations 2. The molded articles 4 are left in retained position on lower inserts 3 as shown in FIG. 3. The article unloader apparatus 1 is mounted on the molding machine, such that the open-ended slots 44 and 42 of outer unloader bar 40 and central bars 41, respectively, are moved into horizontal alignment with the molded articles 4 retained by the lower inserts 3. Suitable control means (not shown) actuate the hydraulic devices 21a to cause outward horizontal movement of the slide bars 40 and 41 to a position at which the outer ends thereof confront a first row of molded articles 4, with each of the slots 42 and 44 being in alignment with a respective molded article of the first lateral row.

Continued movement of the unload assembly 30 causes the slots 42 and 44 to transverse each of the molded articles 4, which lie in axial alignment with the respective articles of the first row, until all the parts are situated in respective pairs of opposed grooves 44 and/or 42 of the unload bars 40 and 41 and span the spacing therebetween. Subsequently, the lower inserts 3 are withdrawn, as shown in phantom in FIG. 3, and the manufactured articles are supported solely between outer bar 40 and center bar 41, or between adjacent center bars 41, with peripheral portions of the articles 4 being retained in the longitudinal grooves of the opposed adjacent pairs. The unload assembly 30, loaded with articles 4, is then withdrawn through retraction of hydraulic extension rods 21 until the cam followers 75 move to abut stop plates 71. At such a position, continued retraction of the extension rods 21 swings the unload assembly 20 in a counterclockwise direction, viewing FIG. 5, to orient the slots 43 and 43a in a sloped direction. The retained parts are thus discharged by gravity into the receptacle 76 or other collection means.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for unloading molded articles from a molding press, said molding apparatus comprising, in combination, an unloading apparatus support plate adapted to be operatively positioned relative to a molding press so as to lie generally parallel to the plane of the plate on which the molded products in said press are positioned for unloading, a reciprocable unloader carrier unit mounted for sliding movement relative to said support plate along an axis parallel to the extent of said plate, an unloading assembly carried and positioned by said carrier unit, said unloading assembly comprising a multiple track unloader which includes a plurality of spaced apart unloader bars, each bar having a slot therein and disposed in facing relation to an associated slot in an adjacent bar, whereby associated pairs of slots comprise individual tracks for receiving said molded articles, means for extending and withdrawing said unloader carrier and said unloading assembly for collecting molded articles from said tracks, said apparatus further including means for pivotally mounting said multiple track unloader relative to said unloader received when said unloader lies in one plane and carrier for swinging movement, whereby said articles may be discharged when said unloader is pivoted so as to lie in another plane.

2. An apparatus as defined in claim 1 which further includes a pair of rollers disposed beneath and adapted to support said multiple-track tractor unloader during at least a portion of the time when said unloader is being extended and withdrawn.

3. An apparatus as defined in claim 1 wherein said unloader bars each includes a beveled nose portion adapted to provide an entrance area of an enlarged width for receiving said molded articles.

4. An apparatus as defined in claim 1 wherein said means for extending and withdrawing said unloader carrier includes at least one piston and cylinder assembly with one part of such assembly being fixed to said carrier unit.

5. An apparatus as defined in claim 1 wherein said apparatus includes a pivot stop associated with said support plate and positioned so as to engage a portion of said means for pivotally mounting said unloader, so as to cause said unloader to pivot when said carrier unit approaches its farthest withdrawn position.

6. An apparatus as defined in claim 1 wherein said unloading apparatus and said molding press are arranged so that said plate extends along a horizontal axis.

7. An apparatus for unloading molded articles from a molding press, said apparatus comprising, in combination, an article removing assembly having a plurality of slotted bars in spaced apart relation to define therebetween a plurality of pairs of interior sidewalls, at least one slot in each of said interior sidewalls, with said slots being arranged in opposed facing relation so as to define therebetween a plurality of article-receiving tracks in adjacent pairs of sidewalls, a support unit for said article-receiving assembly, said support unit including at least one bracket attached to and extending upwardly from at least one of said bars, said bracket being pivotally connected at one of its ends to a positioner for said article removing assembly, and means for reciprocating said positioner relative to an associated molding press for receiving said molded articles and removing them from said press, said article removing assembly being movable in a plane parallel to the plane of the plate on which the molded products in said press are positioned for unloading, and pivotable into another plane for unloading.

* * * * *

UNITED STATES PATENT AND TRADEMARK OFFICE
CERTIFICATE OF CORRECTION

PATENT NO. : 4,363,595

DATED : December 14, 1982

INVENTOR(S) : Jerry D. Reichenbach, et al

It is certified that error appears in the above—identified patent and that said Letters Patent is hereby corrected as shown below:

Column 6, line 63, delete "pairs" and insert "bars".

Signed and Sealed this

Twenty-sixth Day of April 1983

[SEAL]

Attest:

GERALD J. MOSSINGHOFF

Attesting Officer

Commissioner of Patents and Trademarks